US008565065B2

(12) United States Patent
Cheng et al.

(10) Patent No.: US 8,565,065 B2
(45) Date of Patent: Oct. 22, 2013

(54) METHODS AND SYSTEMS FOR UTILIZING A MULTICAST/BROADCAST CID SCHEDULING MAC MANAGEMENT MESSAGE

(75) Inventors: Steven D. Cheng, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1521 days.

(21) Appl. No.: 12/144,579

(22) Filed: Jun. 23, 2008

(65) Prior Publication Data

US 2009/0316806 A1    Dec. 24, 2009

(51) Int. Cl.
*H04J 11/00* (2006.01)
(52) U.S. Cl.
USPC .................. 370/210; 370/390; 370/432
(58) Field of Classification Search
None
See application file for complete search history.

(56) References Cited

U.S. PATENT DOCUMENTS

| 6,839,565 | B2 | 1/2005 | Sarkkinen et al. | |
|---|---|---|---|---|
| 7,912,057 | B2 * | 3/2011 | Petry et al. | 370/390 |
| 8,064,444 | B2 * | 11/2011 | Connors et al. | 370/390 |
| 2002/0093920 | A1 | 7/2002 | Neufeld et al. | |
| 2006/0029011 | A1 * | 2/2006 | Etemad et al. | 370/311 |
| 2007/0253367 | A1 | 11/2007 | Dang et al. | |

FOREIGN PATENT DOCUMENTS

| CN | 1965597 A | 5/2007 |
|---|---|---|
| JP | 2007536790 A | 12/2007 |
| JP | 2007536791 A | 12/2007 |

OTHER PUBLICATIONS

Chion, Mary et al.: "DL-MAP and UL-MAP CID Table IEs with Multiple DL Maps"; IEEE C802.16e-05/034; IEEE 802.16 Broadband Wireless Access Working Group, (Jan. 26, 2005), pp. 0-7, XP002551994.
Chion, Mary et al.: "DL-MAP and UL-MAP CID Table IEs; IEEE C802.16e-05/059r2" IEEE 802.16 Broadband Wireless Access Working Group, (Jan. 26, 2005), pp. 0-5, XP002551993 the whole document.
IEEE Computer Society and IEEE Microwave Theory and Techniques Society: "IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1"; IEEE Std 802.16e-2005 and IEEE Std 802.16-2004/Cort-2005; IEEE Standard; Piscataway, NJ, USA, (Feb. 28, 2006), pp. 1, 44-50, 228-230, 672-677, XP002551992 sections 6.3.2.3 to 6.3.2.3.2 section 6.3.21.1 section 11.4.2.

(Continued)

*Primary Examiner* — Duc C Ho
(74) *Attorney, Agent, or Firm* — Tyler J. Overall

(57) ABSTRACT

Methods and systems for utilizing a multicast/broadcast connection identifier (CID) scheduling message in an orthogonal frequency-division multiplexing (OFDM) or orthogonal frequency division multiple access (OFDMA) frame in an effort to bypass at least a portion of the Media Access Control (MAC) protocol data unit (PDU) parsing of the frame are provided. By bypassing at least a portion of the MAC PDU parsing of the OFDM/OFDMA frame (which may be in accordance with one or more standards of the IEEE 802.16 family of standards), a particular user terminal need not spend a lot of overhead in the CID filtering process, determining which MAC PDUs are intended to be processed by the MAC of that particular user terminal. Furthermore, for certain embodiments, a user terminal may power down related circuitry during the terminal's bypassing time period(s) of the OFDM/OFDMA frame in an effort to save power.

25 Claims, 13 Drawing Sheets

(56) References Cited

OTHER PUBLICATIONS

International Search Report & Written Opinion—PCT/US2009/048067, International Search Authority—European Patent Office—Nov. 5, 2009.

IEEE C802.16e-051034, IEEE 802.16 Broadband Wireless Access Working Group <http://ieee802.org/16>, Date submitted Jan. 12, 2005, pp. 0, 2-7.

Taiwan Search Report—TW098121032—TIPO—Dec. 5, 2012.

* cited by examiner

| FCH (DLFP)_Message_Format | |
|---|---|
| Used SCH bitmap:<br>A bitmap indicating which groups of SCH are used on the 1st PUSC zone and on PUSC zones in which 'use all SC' indicator is set to '0' in STC_DL_Zone_IE0. Value 1 means used by this segment and 0 means not used.<br><br>                    2048      1024    512    128<br>bit 0: SCH Group 0   0~11(12)  0~ 5(6)  0~4(5)  0(1)<br>bit 1: SCH Group 1  12~19( 8)  6~ 9(4)  NA      NA<br>bit 2: SCH Group 2  20~31(12)  10~15(6)  5~9(5)  1(1)<br>bit 3: SCH Group 3  32~39( 8)  16~19(4)  NA      NA<br>bit 4: SCH Group 4  40~51(12)  20~25(6)  10~14(5)  2(1)<br>bit 5: SCH Group 5  52~59( 8)  26~29(4)  NA      NA | 6 bits |
| Reserved: set to 0 | 1 bit |
| Repetition Coding Indication: on DL Map<br>No additional Rep=total 1(0), 1 additional Rep=total 2(1), 3 additional Rep=total 4(2), 5 additional Rep=total 6(3) | 2 bits |
| Coding Indication: on DL Map<br>DL Map shall be transmitted with QPSK at FEC rate 1/2<br>The BS ensures that DL Map (and other MAC msg required for SS operation) are sent with the mandatory coding scheme often enough to ensure uninterrupted operation of SS supporting only the mandatory coding scheme.<br><br>CC(0), BTC(1), CTC(2), ZTCC(3), CC w oINT(4), LDPC(5) | 3 bits |
| DL Map Length:<br>Defines the length in slots of the DL Map msg that follows immediately the DLFP, after repetition code is applied. | 8 bits |
| Reserved: set to 0 | 4 bits |

FIG. 4B

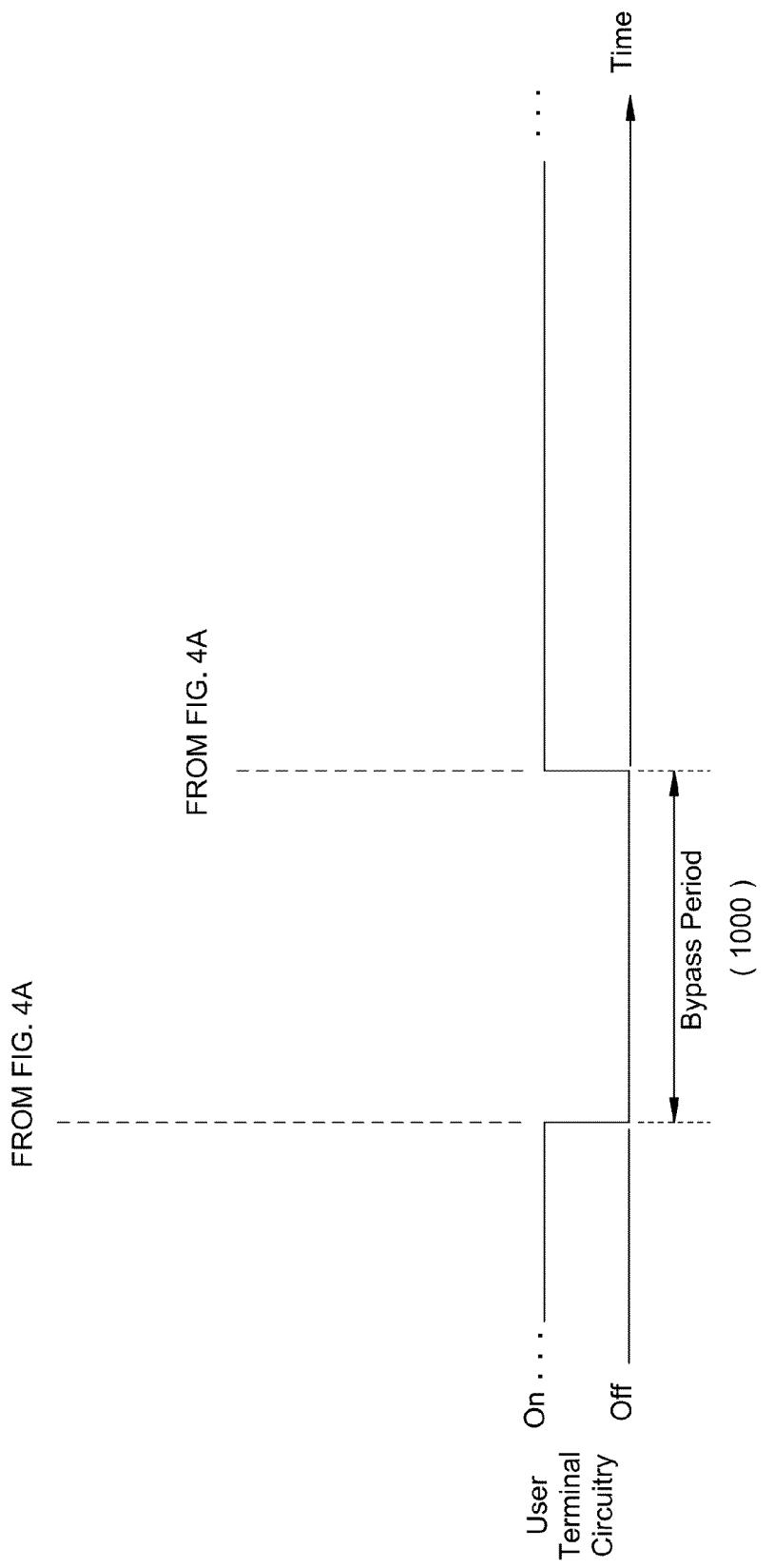

METHODS AND SYSTEMS FOR UTILIZING A MULTICAST/BROADCAST CID SCHEDULING MAC MANAGEMENT MESSAGE

TECHNICAL FIELD

Certain embodiments of the present disclosure generally relate to wireless communication and, more particularly, to providing multicast/broadcast connection identifier (CID) scheduling information in an orthogonal frequency-division multiplexing (OFDM) or orthogonal frequency division multiple access (OFDMA) frame.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station emits and receives radio frequency (RF) signals that convey data to and from the mobile stations. Such an RF signal from a base station includes an overhead load, in addition to the data load (voice and other data), for various communication management functions. Each mobile station processes the information in the overhead load of each received signal prior to processing the data.

The IEEE 802.16x standard was developed for the delivery of such wideband services as voice, data, and video. The Media Access Control (MAC) layer of the standard can support bursty data traffic with high peak rate demand while simultaneously supporting streaming video and latency-sensitive voice traffic over the same channel. Some of this traffic may include broadcast and/or multicast data intended for delivery to a plurality of mobile stations. The resources allocated to one mobile station or to a multicast/broadcast connection by the MAC scheduler can vary from a single time slot to the entire OFDM/OFDMA frame, thus providing a very large dynamic range of throughput to a specific mobile station or to a plurality of mobile stations, respectively, at any given time. Furthermore, since the resource allocation information is conveyed in the MAP messages at the beginning of each frame, the scheduler can effectively change the resource allocation on a frame-by-frame basis to adapt to the bursty nature of the traffic.

SUMMARY

Certain embodiments of the present disclosure generally relate to providing a multicast/broadcast connection identifier (CID) scheduling message in an orthogonal frequency-division multiplexing (OFDM) or orthogonal frequency division multiple access (OFDMA) frame in an effort to bypass at least a portion of the Media Access Control (MAC) protocol data unit (PDU) parsing of the frame. By bypassing at least a portion of the MAC PDU parsing of the OFDM/OFDMA frame, a particular user terminal need not spend a lot of overhead in the CID filtering process, determining which MAC PDUs are intended to be processed by the MAC of that particular user terminal. Furthermore for some embodiments, a user terminal may power down related circuitry during the terminal's bypassing time period(s) of the OFDM/OFDMA frame in an effort to save power.

Certain embodiments of the present disclosure provide a method for processing multicast or broadcast data transmitted in OFDM or OFDMA frames. The method generally includes decoding a downlink MAP (DL-MAP); extracting CID scheduling information contained in the DL-MAP, wherein the scheduling information identifies the location of data bursts associated with one or more multicast or broadcast CIDs within one or more OFDM or OFDMA frames; and bypassing at least a portion of the one or more frames based on the scheduling information when parsing the frames.

Certain embodiments of the present disclosure provide a receiver for processing multicast or broadcast data transmitted in OFDM or OFDMA frames. The receiver generally includes decoding logic configured to decode a DL-MAP; extracting logic configured to extract CID scheduling information contained in the DL-MAP, wherein the scheduling information identifies the location of data bursts associated with one or more multicast or broadcast CIDs within one or more OFDM or OFDMA frames; and bypassing logic configured to bypass at least a portion of the one or more frames based on the scheduling information when parsing the frames.

Certain embodiments of the present disclosure provide an apparatus for processing multicast or broadcast data transmitted in OFDM or OFDMA frames. The apparatus generally includes means for decoding a DL-MAP; means for extracting CID scheduling information contained in the DL-MAP, wherein the scheduling information identifies the location of data bursts associated with one or more multicast or broadcast CIDs within one or more OFDM or OFDMA frames; and means for bypassing at least a portion of the one or more frames based on the scheduling information when parsing the frames.

Certain embodiments of the present disclosure provide a mobile device capable of processing multicast or broadcast data. The mobile device generally includes a receiver front end for receiving signals based on multicast or broadcast data transmitted in OFDM or OFDMA frames; decoding logic configured to decode a DL-MAP; extracting logic configured to extract CID scheduling information contained in the DL-MAP, wherein the scheduling information identifies the location of data bursts associated with one or more multicast or broadcast CIDs within one or more OFDM or OFDMA frames; and bypassing logic configured to bypass at least a portion of the one or more frames based on the scheduling information when parsing the frames.

Certain embodiments of the present disclosure provide a computer-program product for processing multicast or broadcast data transmitted in OFDM or OFDMA frames comprising a computer readable medium having a set of instructions stored thereon, the set of instructions being executable by one or more processing devices and the set of instructions including: instructions for decoding a DL-MAP, instructions for extracting CID scheduling information contained in the DL-MAP, wherein the scheduling information identifies the location of data bursts associated with one or more multicast or broadcast CIDs within one or more OFDM or OFDMA frames, and instructions for bypassing at least a portion of the one or more frames based on the scheduling information when parsing the frames.

Certain embodiments of the present disclosure provide a method for transmitting multicast or broadcast data in OFDM or OFDMA frames. The method generally includes obtaining scheduling information identifying the location of data bursts, associated with one or more multicast or broadcast CIDs, to be transmitted in one or more OFDM or OFDMA frames; and transmitting the scheduling information in a portion of a DL-MAP of the one or more frames.

Certain embodiments of the present disclosure provide a transmitter for transmitting multicast or broadcast data in OFDM or OFDMA frames. The transmitter generally includes scheduling logic configured to obtain scheduling information identifying the location of data bursts, associated with one or more multicast or broadcast CIDs, to be transmitted in one or more OFDM or OFDMA frames; and transmission logic configured to transmit the scheduling information in a portion of a DL-MAP of the one or more frames.

Certain embodiments of the present disclosure provide an apparatus for transmitting multicast or broadcast data in OFDM or OFDMA frames. The apparatus generally includes means for obtaining scheduling information identifying the location of data bursts, associated with one or more multicast or broadcast CIDs, to be transmitted in one or more OFDM or OFDMA frames; and means for transmitting the scheduling information in a portion of a DL-MAP of the one or more frames.

Certain embodiments of the present disclosure provide a mobile device capable of transmitting multicast or broadcast data. The mobile device generally includes logic configured to obtain scheduling information identifying the location of data bursts, associated with one or more multicast or broadcast CIDs, to be transmitted in one or more OFDM or OFDMA frames; and a transmitter front end for transmitting the scheduling information in a portion of a DL-MAP of the one or more frames.

Certain embodiments of the present disclosure provide a computer-program product for transmitting multicast or broadcast data in OFDM or OFDMA frames comprising a computer readable medium having a set of instructions stored thereon, the set of instructions being executable by one or more processing devices and the set of instructions including: instructions for obtaining scheduling information identifying the location of data bursts, associated with one or more multicast or broadcast CIDs, to be transmitted in one or more OFDM or OFDMA frames, and instructions for transmitting the scheduling information in a portion of a DL-MAP of the one or more frames.

Certain embodiments, as summarized above, also comprise the OFDM or OFDMA frames including a format in accordance with one or more standards of the Institute of Electrical and Electronics Engineers (IEEE) 802.16 family of standards.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 4A and 4B illustrate an example OFDM/OFDMA frame for Time Division Duplex (TDD) and the format of the Frame Control Header (FCH) contained therein, the FCH including downlink Frame Prefix (DLFP) information, in accordance with certain embodiments of the present disclosure.

FIG. 10 illustrates powering down circuitry of a user terminal during an OFDM/OFDMA frame bypassing time period containing no MAC PDUs for that user terminal, in accordance with certain embodiments of the present disclosure.

DETAILED DESCRIPTION

Figure 1:
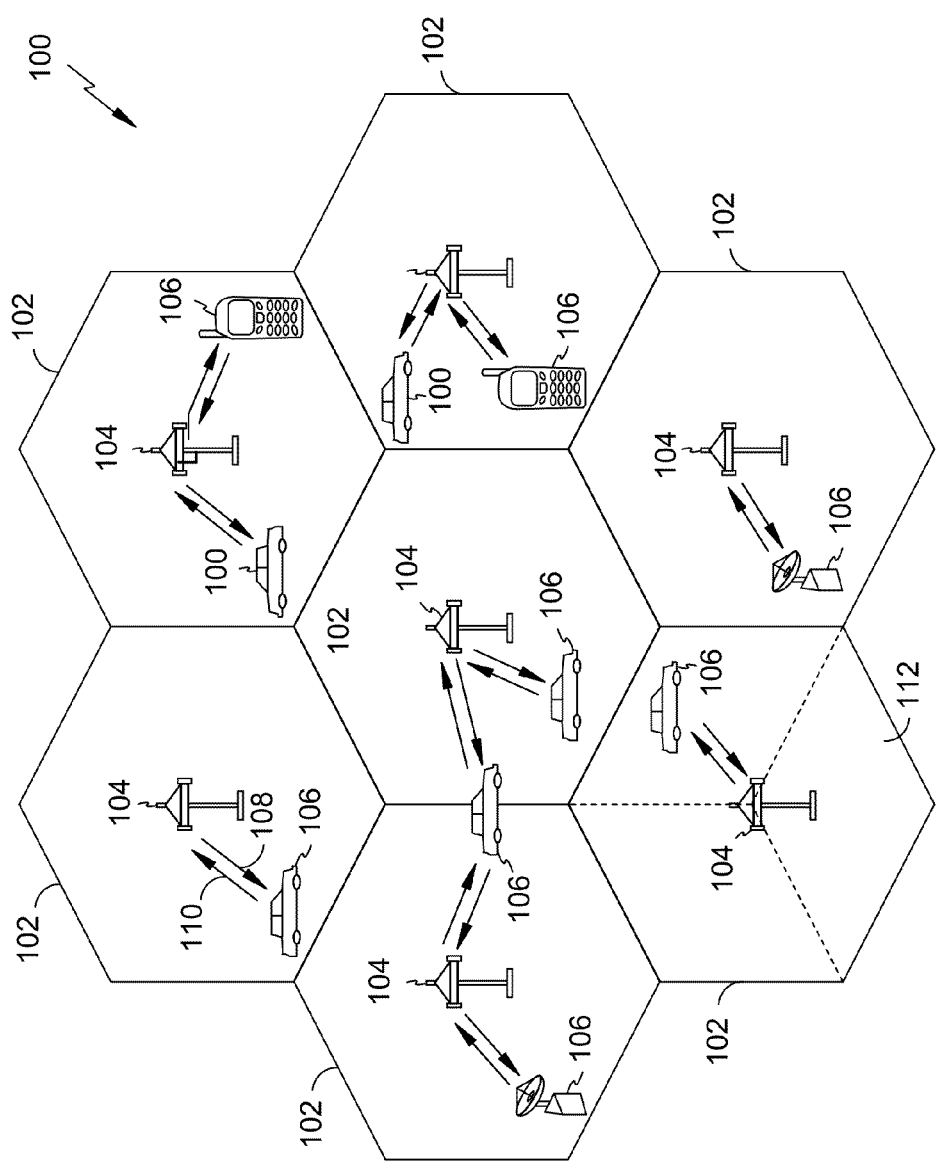
FIG. 1 illustrates an example wireless communication system, in accordance with certain embodiments of the present disclosure.

Certain embodiments of the present disclosure provide techniques and apparatus for providing information regarding multicast/broadcast connection identifier (CID) scheduling in an orthogonal frequency-division multiplexing (OFDM) or orthogonal frequency division multiple access (OFDMA) frame. The CID scheduling information may be included, for example, as a Media Access Control (MAC) management message contained in a DL-MAP. A user terminal may process this CID scheduling message to locate DL bursts of interest (e.g., for channels of a media broadcast associated with given CIDs).

As a result, rather than process the entire frame of data in order to locate DL bursts of interest and filtering out DL bursts that are not of interest, the user terminal (e.g., mobile station) may be able to bypass at least a portion of the Media Access Control (MAC) protocol data unit (PDU) parsing of the frame. By bypassing at least a portion of the MAC PDU parsing of the OFDM/OFDMA frame, a particular user terminal need not spend a lot of overhead in the CID filtering process, determining which MAC PDUs are intended to be processed by the MAC of that particular user terminal. Furthermore for some embodiments, a user terminal may power down related circuitry during the terminal's bypassing time period(s) of the OFDM/OFDMA frame in an effort to save power.

Exemplary Wireless Communication System

The methods and apparatus of the present disclosure may be utilized in a broadband wireless communication system. The term "broadband wireless" refers to technology that provides wireless, voice, video, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM and OFDMA technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one Media Access Control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
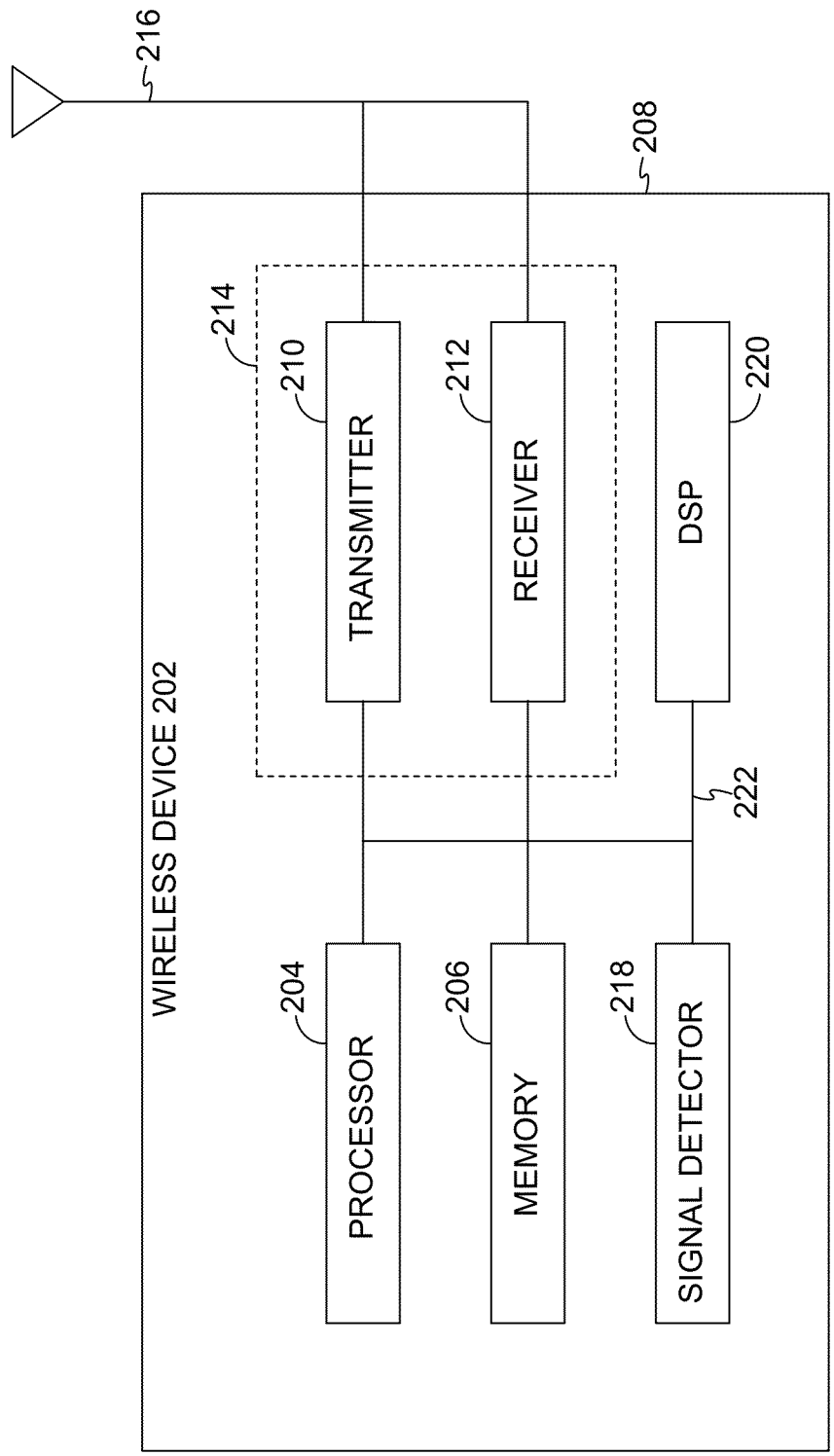
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
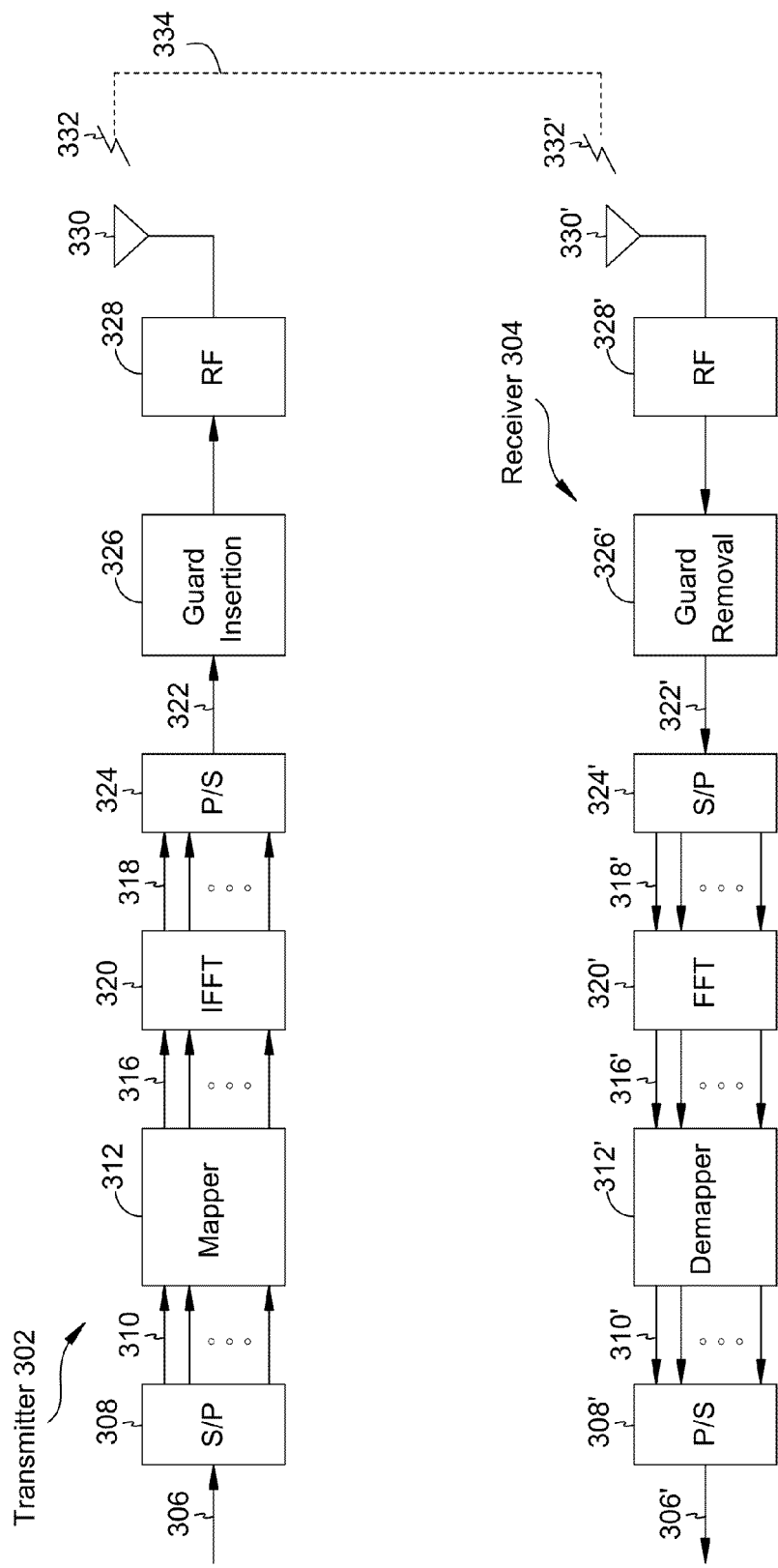
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDM/OFDMA Frame with CID Scheduling Message

Figure 4A:
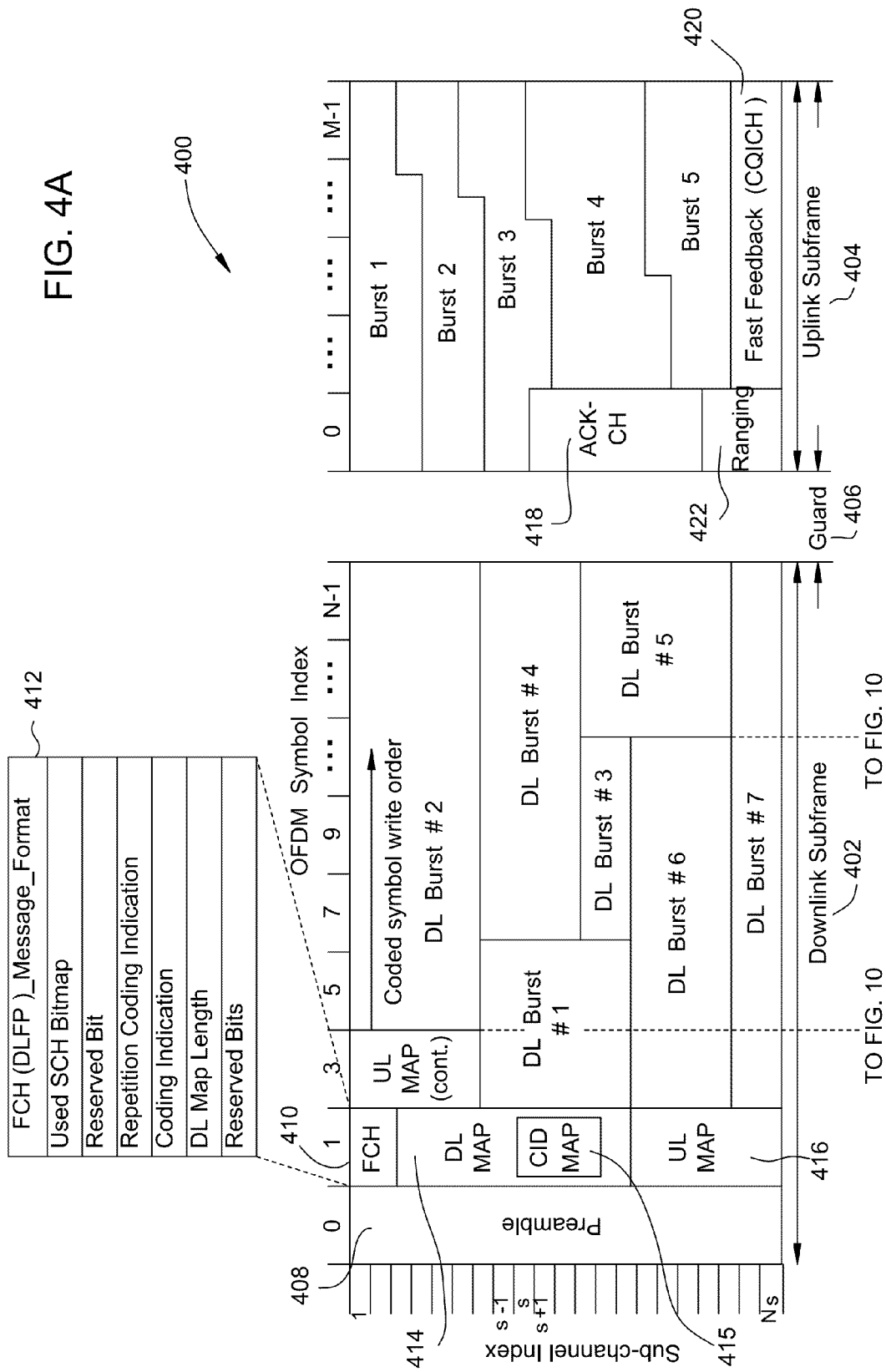

Referring now to FIG. 4A, an OFDM/OFDMA frame 400 containing a multicast/broadcast CID scheduling message for a Time Division Duplex (TDD) implementation is depicted as a typical, but not limiting, example. As illustrated, the CID scheduling message may be included in the DL-MAP 414 as a CID MAP 415 for certain embodiments. As will be described in greater detail below, the CID scheduling message may provide the location, within the frame 400, of DL-Bursts associated with particular multicast/broadcast CIDs. As the DL-MAP 414 is decoded by all user terminals, including the CID scheduling message in the DL-MAP 414 allows all user terminals access to the scheduling information contained therein.

Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation illustrated, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) 412, outlining the frame configuration information may be mapped to the FCH 410.

As illustrated in FIG. 4B, the DLFP 412 for Mobile WiMAX may comprise six bits for the used subchannel (SCH) bitmap 412a, a reserved bit 412b set to 0, two bits for the repetition coding indication 412c, three bits for the coding indication 412d, eight bits for the MAP message length 412e, and four reserved bits 412f set to 0 for a total of 24 bits in the DLFP 412. Before being mapped to the FCH 410, the 24-bit DLFP may be duplicated to form a 48-bit block, which is the minimal forward error correction (FEC) block size.

Following the FCH 410, a DL-MAP 414 and a UL-MAP 416 may specify data burst allocation and other control information for the DL and UL subframes 402, 404. In the case of OFDMA, multiple users may be allocated data regions within the frame, and these allocations may be specified in the DL and UL-MAP messages 414, 416. The MAP messages may include the burst profile for each user, which defines the modulation and coding scheme used in a particular link. Since MAP messages contain critical information that needs to reach all users, the DL and UL-MAP messages 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated.

Thus, the DL-MAP 414 may describe the location of the bursts contained in the downlink zones and the number of downlink bursts, as well as their offsets and lengths in both the time (i.e., symbol) and the frequency (i.e., subcarrier or subchannel) directions. For certain embodiments, the CID scheduling message (e.g., CID MAP 415) may provide additional information about the location, within the frame 400, for multicast/broadcast data bursts associated with particular CIDs. Providing this information in the CID scheduling message may allow a user terminal to bypass particular DL bursts associated with CIDs that are not of interest. For certain embodiments, a user terminal may power down certain components if portions to be bypassed allow sufficient time.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains the first two subchannel groups, segment 1 contains the next two, and segment 2 contains the last two subchannel groups). Another type of zone is called DL-FUSC (downlink full usage of subchannels). Unlike DL-PUSC, DL-FUSC does not use any segments, but can distribute all bursts over the complete frequency range.

Exemplary DL-MAP with a CID Scheduling Message

Figure 5:
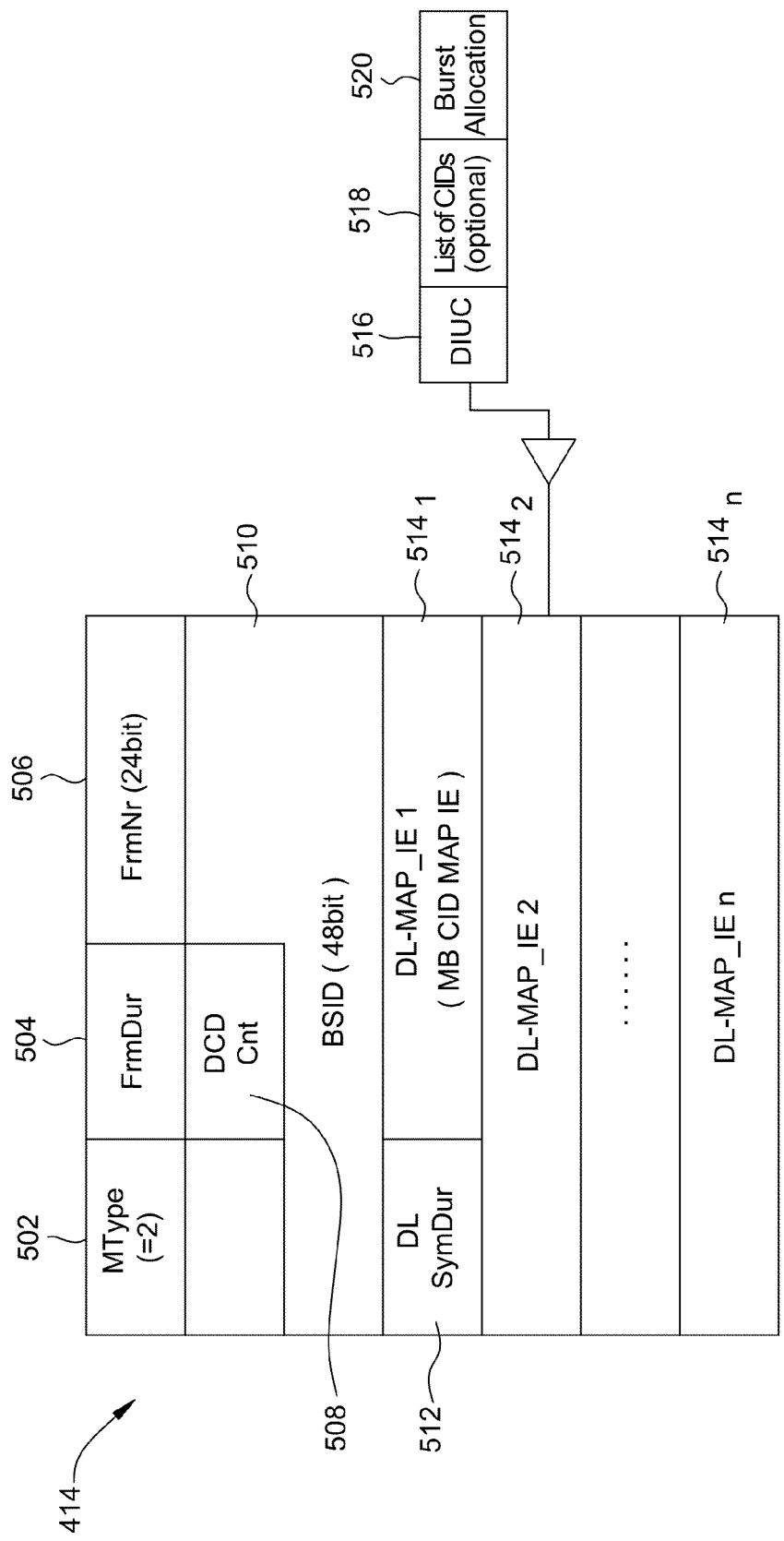
FIG. 5 illustrates an example downlink map (DL-MAP) message with a multicast/broadcast connection identifier (CID) MAP IE, in accordance with certain embodiments of the present disclosure.

The DL-MAP 414 of FIG. 4A, containing a multicast/broadcast CID scheduling message, is illustrated in more detail in FIG. 5.

The DL-MAP 414 may begin with a Management Message Type 502 having a length of 8 bits, which has a value of 2 ($00000010_b$) to indicate the control message is a DL-MAP. The Management Message Type 502 may be followed by a frame duration code 504, which is 8 bits long, and a frame number 506, which is 24 bits long. The frame number 506 may be followed by a Downlink Channel Descriptor (DCD) count 508 having a length of 8 bits and matching the DCD configuration change count value. The DCD message refers to physical (PHY) and Media Access Control (MAC) layer-related parameters to be applied to each burst interval allocated to the downlink, which include a modulation type, a forward error correction (FEC) code type, and the like. The DCD count 508 may be followed by a base station identifier (BSID) 510, having a length of 6 bytes for a total length of 48 bits. The BSID 510 may uniquely identify the network base station and may be followed by a DL symbol duration 512 indicating a number of OFDMA symbols in the DL subframe 402 and having a length of 8 bits.

A number (n) of DL-MAP information elements (IEs) 514 having variable lengths may follow the DL symbol duration 512. A generic DL-MAP IE 514 may comprise a Downlink Interval Usage Code (DIUC) 516, a list of connection IDs 518, and the DL burst allocation 520 (e.g., subchannel offset, symbol offset, subchannel number, and symbol number) to define a downlink transmission. A DIUC 516 between 0 and 12 inclusive may indicate that the DL-MAP IE provides a DL burst profile (i.e., the modulation and coding scheme used in the burst), while a DIUC 516 of 14 or 15 may indicate that the DL-MAP IE is a control information element. A DIUC 516 having a 4-bit value of 15 ($1111_b$) may indicate a DL-MAP Extended IE, and a DIUC 516 having a 4-bit value of 14 ($1110_b$) may indicate a DL-MAP Extended-2 IE. A DIUC 516 of 13 may indicate that the DL-MAP IE is used for safety zones (i.e., gap) and peak-to-average-power ratio (PAPR) reduction. Although not shown in FIG. 5, some embodiments of the DL-MAP 414 may include padding having a length of 4 bits in an effort to reach a byte boundary for the DL-MAP 414.

Exemplary MAC PDU

Figure 6:
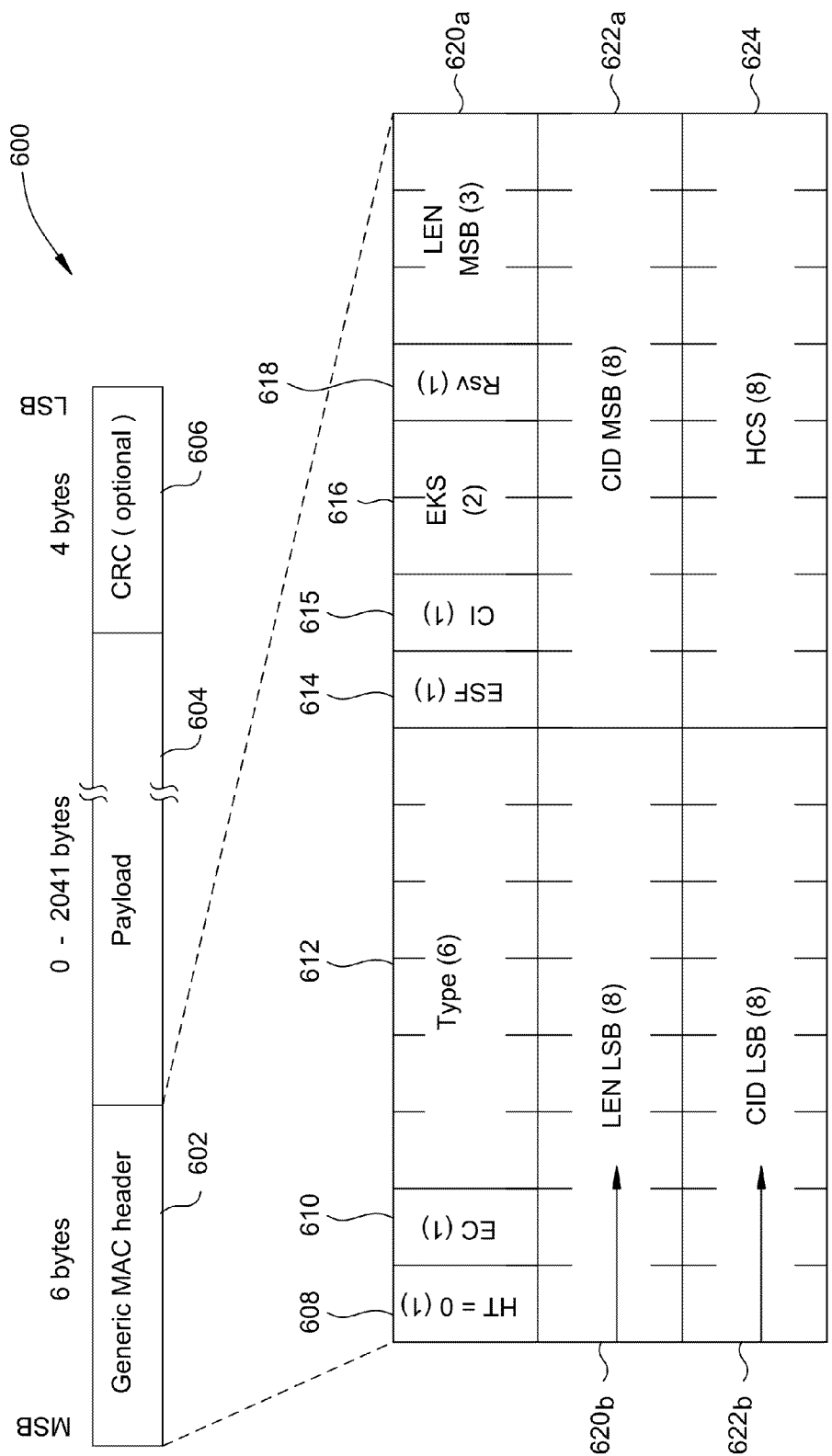
FIG. 6 illustrates the format of a Media Access Control (MAC) protocol data unit (PDU) and the CID within the generic MAC header (GMH) for the MAC PDU, in accordance with certain embodiments of the present disclosure.

Referring now to FIG. 6, the DL bursts within the OFDM/OFDMA frame 400 may comprise one or more Media Access Control (MAC) protocol data units (PDUs) 600 containing MAC management messages or user data. A typical MAC PDU 600 may consist of three components: a generic MAC header (GMH) 602 containing PDU control information, a variable length PDU body known as the payload 604 containing information specific to the PDU type, and an optional frame check sequence (FCS), which may contain an IEEE 32-bit (4-byte) cyclic redundancy check (CRC) 606 code. Containing the actual MAC management message or the user data, the payload 604 may vary in length from 0 to 2041 bytes if there is no CRC present or may vary from 0 to 2037 bytes with the CRC 606 present. For OFDMA, the CRC 606 is typically mandatory.

The GMH 602 may comprise a 1-bit header type (HT) 608 having a value equal to 0. A header type equal to 1 may indicate a MAC signaling header for uplink transmission or a compressed/reduced private DL-MAP for downlink transmission, which are beyond the scope of this disclosure. The HT 608 may be followed by a 1-bit encryption control (EC) 610 indicating whether the payload 604 is encrypted and a 6-bit type field 612, thereby composing the first byte of the GMH 602. The type field 612 may indicate the PDU type and any subheaders or special payload types in the message payload 604.

The next byte of the GMH 602 may include a 1-bit extended subheader field (ESF) 614, a 1-bit CRC indicator (CI) 6, a 2-bit encryption key sequence (EKS) 616 providing an index into a vector of encryption key information, and a reserved bit 618. Following the reserved bit 618, a length field 620 may indicate the length of the MAC PDU in bytes including the length of the GMH 602. The length field 620 may be divided into two different bytes of the GMH 602, wherein the first portion 620a typically includes the first three bits including the most significant bit (MSB) of the length field 620 and the second portion 620b typically includes the last 8 bits including the least significant bit (LSB).

A two-byte connection identifier (CID) 622 (shown in separate bytes, as 622a and 622b) may follow the length field 620 for a total of 6 bytes in the GMH 602. As a MAC-layer address, the CID 622 may uniquely identify a connection, which, as defined herein, generally refers to a unidirectional mapping between MAC peers over the airlink. A connection may be a unicast connection between a base station (BS) 104 and a user terminal 106 (MS). For multicast and broadcast services (MBS) where multicast or broadcast information is intended for delivery to a plurality of user terminals (e.g. subscriber stations or mobile stations), the BS 104 may provide the user terminal 106 with access by creating a multicast traffic connection with each user terminal to be associated with the service or a broadcast transport connection. The CID 622 used for the MBS may be the same for all user terminals on the same channel that participate in the connection.

A one-byte header check sequence (HCS) 624 may follow the CID 622 in the generic MAC header 602. The HCS 624 may provide a CRC in an effort to detect errors in the GMH 602.

Figure 7:
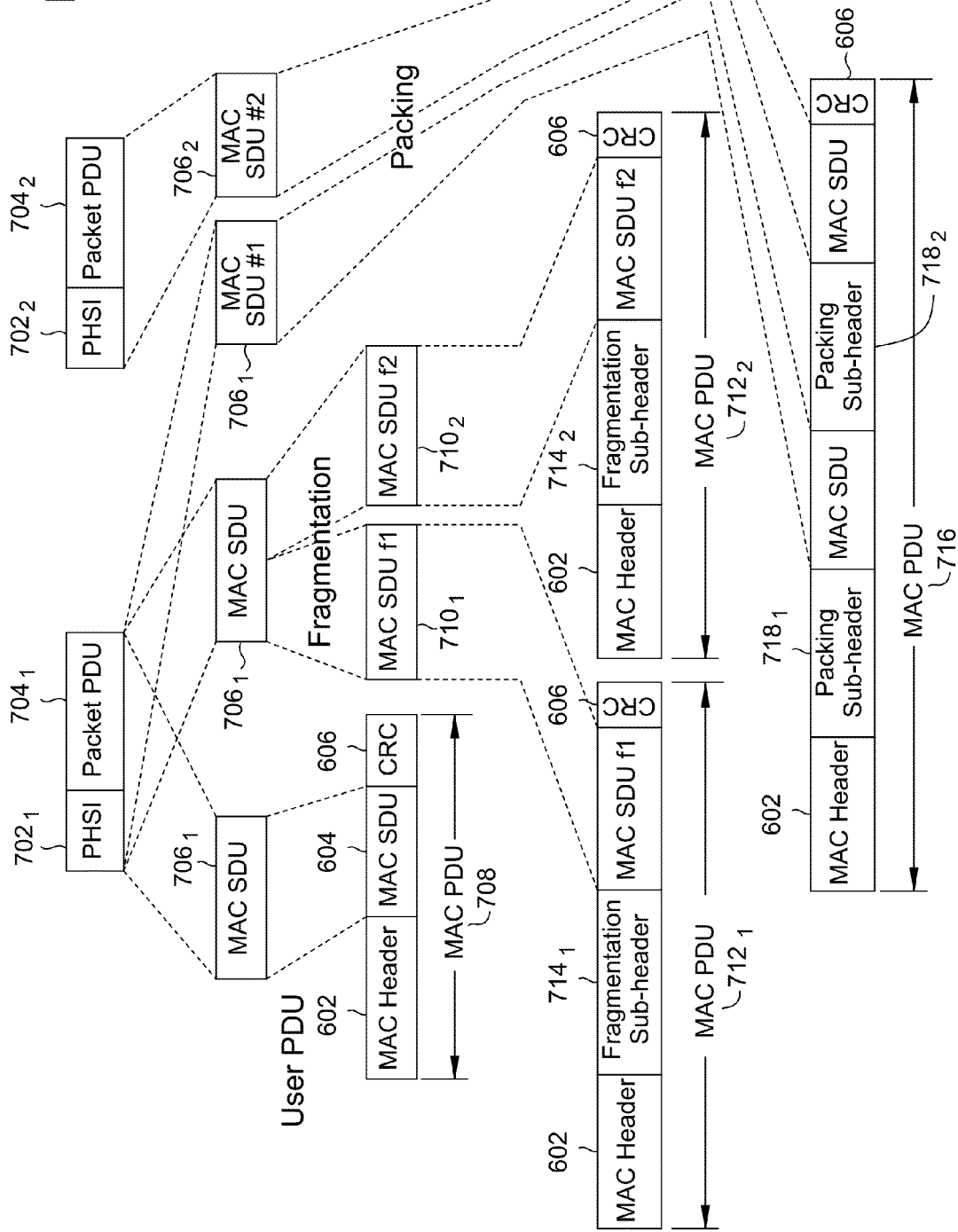
FIG. 7 illustrates examples of MAC PDU construction including fragmentation and packing, in accordance with certain embodiments of the present disclosure.

FIG. 7 illustrates examples of MAC PDU construction including fragmentation and packing. In the convergence sublayer (CS) of the MAC (layer 2 in the Open System Interconnection (OSI) Reference Model), a packet header suppression identifier (PHSI) 702 may be added to a packet PDU 704 from a higher layer, such as the network layer (layer 3 in the OSI Reference Model), in an effort to form a MAC service data unit (SDU) 706.

Depending on various factors, such as the quality of service (QoS) desired and the available bandwidth, the entire MAC SDU 706 may be incorporated into the payload 604 of a MAC PDU 708 by a lower sublayer of the MAC, such as the MAC common part sublayer (CPS) for certain instances. In other instances, the MAC SDU 706 may be divided into two MAC SDU fragments $710_1$, $710_2$. The MAC SDU fragments 710 may have different lengths. Each fragment 710 may be incorporated into the payload 604 of a different MAC PDU 712 following a fragmentation subheader 714. Fragmentation may allow efficient use of available bandwidth relative to the QoS requirements of a connection's service flow.

In contrast with fragmentation in which one MAC SDU 706 is divided into a plurality of MAC SDU fragments 710, another MAC PDU construction technique comprises packing, in which multiple MAC SDUs are combined in the payload 604 of a single MAC PDU. For example, a first MAC SDU $706_1$ and a second MAC SDU $706_2$, which may have different lengths, may be incorporated into a single MAC PDU 716. Each MAC SDU 706 in the payload 604 may be preceded by a packing subheader 718.

A DL burst may contain one or more MAC PDUs 708, 712, 716 of various types concatenated together within the burst. Thus, a DL burst may contain one or more CIDs 622, some of which may signify multicast traffic connections or broadcast transport connections.

Exemplary Method of Using a Multicast/Broadcast CID Scheduling Message

Without multicast/broadcast CID scheduling information indicating the location of WiMAX multicast/broadcast bursts of interest, a user terminal might inefficiently parse an entire frame only to filter out the MAC PDUs within the DL bursts of the OFDM/OFDMA frame that are not intended for that user terminal based on the CID for a multicast traffic connection or a broadcast transport connection. In such a scenario, after determining which MAC PDUs are intended for that user terminal, the user terminal may begin processing and decoding the multicast/broadcast data such that the data may be sent from the MAC layer to higher layers. However, especially in cases where the portion of the DL subframe for multicast/broadcast data is a small fraction of the DL subframe data, a user terminal may spend a lot of overhead in the CID filtering process, parsing the MAC PDUs.

By providing multicast/broadcast CID scheduling information (e.g., in a CID scheduling MAC management message), certain embodiments of the present disclosure provide methods and apparatus to bypass at least some of the MAC PDU parsing in an effort to reduce the overhead spent in the CID filtering process. Since the scheduling and resource allocation for multicast/broadcast data within an OFDM/OFDMA frame is known to the base station 104 before a signal based on a particular frame is broadcast, the scheduling information may be incorporated into the frame. In this manner, a given user terminal receiving the signal may use the scheduling information to avoid parsing at least a portion of the DL subframe 402 that does not pertain to that particular user terminal.

The multicast/broadcast scheduling information may be incorporated into an OFDM/OFDMA frame in any suitable manner. The scheduling information may be considered as a MAC management message and may be based on the CIDs for multicast and broadcast connections. Such a multicast/broadcast CID scheduling MAC management message may comprise CID information, timing information, and modulation information. The CID information may allow a user terminal to determine whether the multicast/broadcast CID scheduling message applies to that particular user terminal. The timing information may denote the starting OFDM/OFDMA symbol for the multicast/broadcast data or where the user terminal may begin parsing the MAC PDUs in the DL subframe. The modulation information may signify the user terminal which modulation and coding scheme was used to encode the multicast/broadcast data.

For certain embodiments, the multicast/broadcast CID scheduling message may be included in the DL-MAP 414 as illustrated in FIG. 5. In such cases, the CID scheduling message may be a CID MAP and may be configured as a DL-MAP IE 514, such as the multicast/broadcast (MB) CID MAP IE located as the first DL-MAP IE $514_1$ following the DL symbol duration 512. First DL-MAP IE $514_1$ may be followed by a second DL-MAP IE $514_2$, and so on, through n DL-MAP IEs $512_n$. The MB CID MAP IE may be located in any DL-MAP IE position. Being a control IE, the MB CID MAP IE may be a DL-MAP Extended IE or a DL-MAP Extended-2 IE. Because the DL-MAP may most likely be sent over a very reliable link, such as BPSK or QPSK with rate ½ coding and repetition coding as described above, most if not all user terminals may most likely be able to receive the MB CID MAP IE.

For certain other embodiments, the multicast/broadcast CID scheduling MAC management message may be incorporated as one or more MAC PDUs within a DL burst of the OFDM/OFDMA frame. In an effort to save CID filtering overhead, the multicast/broadcast CID scheduling message may most likely reside in one of the earlier DL bursts (i.e. a DL burst having a lower symbol index), such as the first DL burst after the UL-MAP 416, as opposed to a later DL burst (i.e., a DL burst with a higher symbol index). However, if the DL burst containing the MAC PDU(s) with the multicast/broadcast scheduling message is transmitted with a higher-order modulation and coding scheme, not all user terminals may be able to receive the CID scheduling message.

Figure 8:
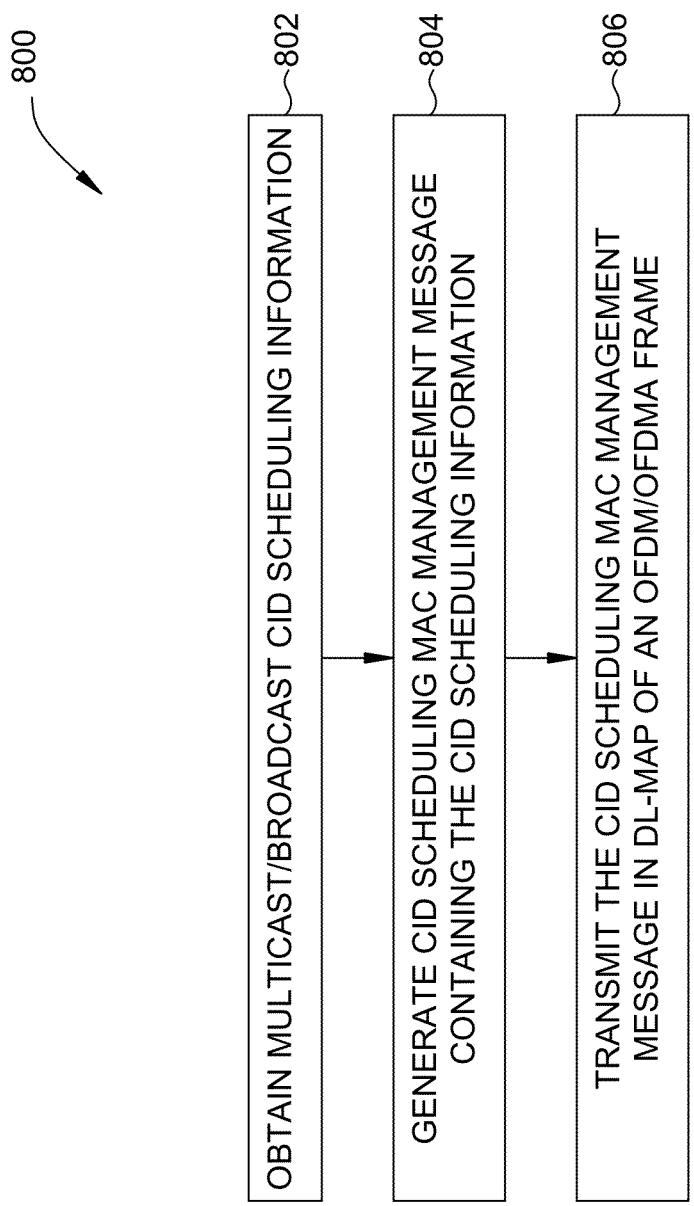
FIG. 8 is a flow diagram of example operations for transmitting multicast/broadcast data using OFDM/OFDMA frames that include multicast/broadcast CID scheduling information, in accordance with certain embodiments of the present disclosure.

FIG. 8 is a flow diagram of example operations 800 for transmitting CID scheduling information in an OFDM/OFDMA frame, using a multicast/broadcast CID scheduling message in the DL-MAP. The operations 800 may, for example, be performed by a base station 104.

The operations 800 begin, at 802, by obtaining scheduling multicast/broadcast CID scheduling information. The base station will have this information, as it already allocates the different CID DL bursts among the frame. At 804, a CID scheduling MAC management message containing the CID scheduling information is generated. This message may include the CID scheduling information in any suitable format, for example, as a list of CIDs and pointer information indicating the locations within the frame for the corresponding data bursts.

At 806, the CID scheduling MAC management message is transmitted in the DL-MAP of a frame. A user terminal receiving this message may bypass processing DL bursts pertaining to CIDs that are not of interest.

Figure 9:
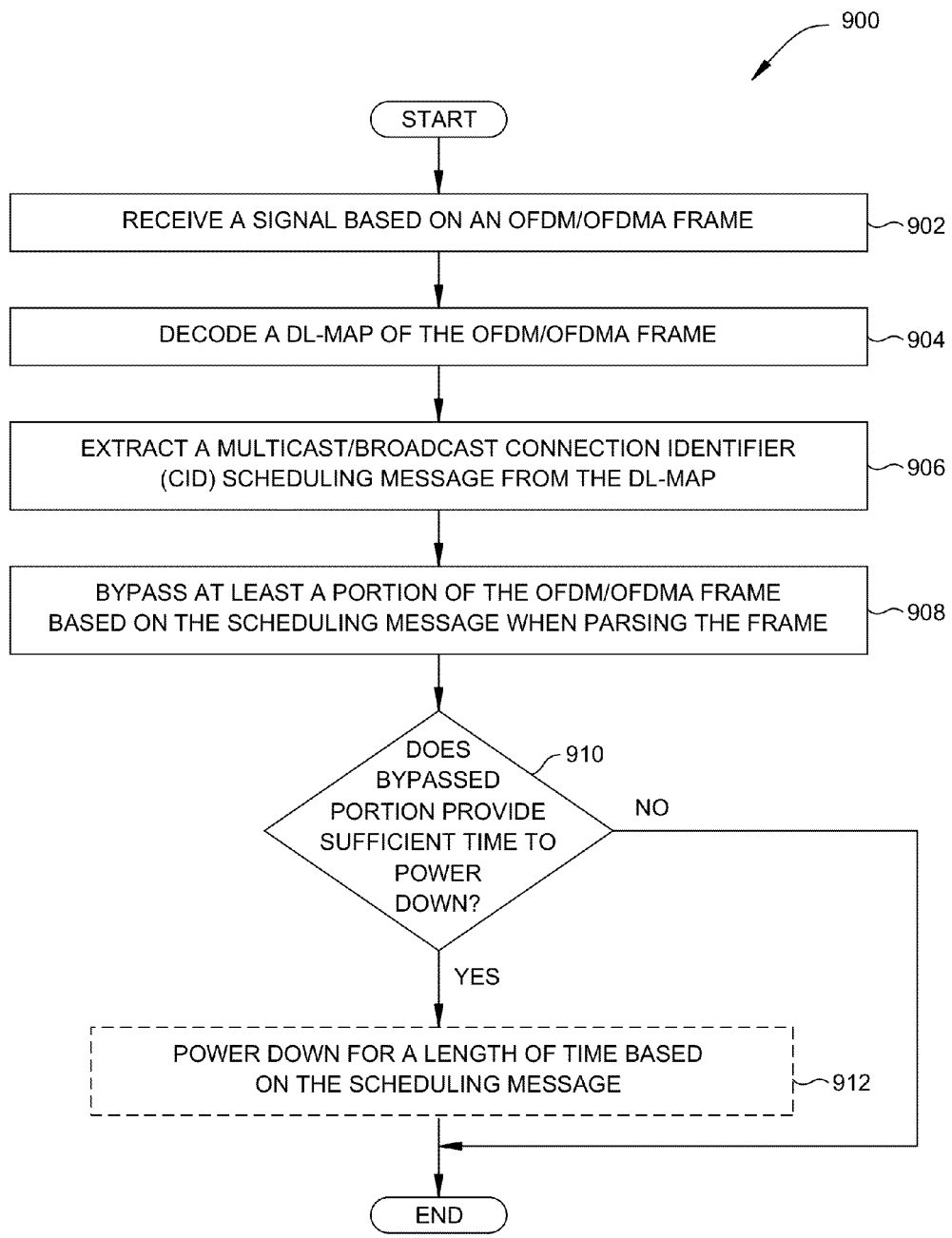
FIG. 9 is a flow diagram of example operations for processing multicast/broadcast data transmitted in OFDM/OFDMA frames with CID scheduling information, in accordance with certain embodiments of the present disclosure.

FIG. 9 is a flow diagram of example operations 900 for processing an OFDM/OFDMA frame and bypassing a portion of the frame parsing based on the scheduling message. The operations 900 may begin, at 902, by receiving a signal based on an OFDM/OFDMA frame. At 904, the DL-MAP 414 of the OFDM/OFDMA frame may be decoded, and a multicast/broadcast CID scheduling message may be extracted from the DL-MAP at 906.

At 908, at least a portion of the OFDM/OFDMA frame may be bypassed when parsing the MAC PDUs based on the extracted multicast/broadcast CID scheduling message. For example, the multicast/broadcast CID scheduling message may indicate that the DL subframe does not contain any multicast/broadcast data, and in such cases, the entire DL subframe—or at least the remaining portion after processing the DL-MAP 414 and UL-MAP 416—may be bypassed. As another example, the DL subframe may contain multicast/broadcast data, but the multicast/broadcast CID scheduling message may indicate that one or more DL bursts do not contain any multicast/broadcast data. In such cases, any one, a combination, or all of these DL bursts may be bypassed according to the CID scheduling message. As yet another example, a given DL burst may contain multicast/broadcast data, but the multicast/broadcast CID scheduling message may indicate that one or more MAC PDUs within the particular DL burst do not contain any multicast/broadcast data. In such cases, any one, a combination, or all of these MAC PDUs may be bypassed according to the CID scheduling message.

Taking this one step further, FIG. 7 illustrates that some MAC PDUs 716 may contain more than one MAC SDU 706. In some cases, one or more of the MAC SDUs may be multicast/broadcast data, while the other MAC SDUs may comprise other elements, such as unicast data or a control message. Therefore, the multicast/broadcast CID scheduling message may indicate that a portion of a MAC PDU does not contain any multicast/broadcast data. In such cases, any one, a combination, or all of these MAC SDUs without multicast/broadcast data may be bypassed according to the CID scheduling message.

For certain embodiments, whether there is sufficient time to power down circuitry related to MAC PDU parsing and processing in a user terminal that received the signal may be determined at 910. To determine this, the time period for bypassing a portion of the DL subframe according to the multicast/broadcast CID scheduling message (i.e., the bypass period) may be compared against a predetermined threshold, for example. If the bypass period is greater than the predetermined threshold, the circuitry may be powered down at 912 during the bypass period. In this manner, the user terminal may conserve power, which may be especially desirable for battery-powered user terminals, such as cell phones or laptop computers. If the bypass period is not greater than the predetermined threshold, the related circuitry may remain powered on during the bypass period.

For example, suppose that DL Burst #5 in FIG. 4A contains broadcast data and that the MAC PDUs within DL Burst #5 contain a CID 622 according to one or more broadcast transport connections. The DL-MAP 414 may comprise a multicast/broadcast CID scheduling message denoting that a user terminal interested in only the multicast/broadcast data may potentially bypass parsing the MAC PDUs of the DL subframe in all of the DL bursts with the exception of DL Burst #5. In this case, the bypass period may start after the OFDM/OFDMA symbols for the UL-MAP 416 and may end at the OFDM/OFDMA symbols for the DL Burst #5. The bypass period for this particular user terminal may be determined to be sufficiently long at 910 such that the user terminal circuitry related to MAC PDU parsing and processing (which is normally on) may be powered down at 912 during the bypass period. This related circuitry may be powered up in an effort to parse and process the MAC PDUs within DL Burst #5 according to the multicast/broadcast CID scheduling message.

Returning to FIG. 9, any remaining portion of the DL subframe that is not bypassed may be parsed, and the MAC PDUs pertaining to the user terminal that received the signal according to the CIDs 622 may be processed (e.g., decoded). Once portions of the DL subframe 402 have been bypassed or processed and the UL subframe 404 has been transmitted, the user terminal(s) may wait to receive a new signal based on a new OFDM/OFDMA frame, and the operations 900 may repeat beginning at 902.

Figure 8A:
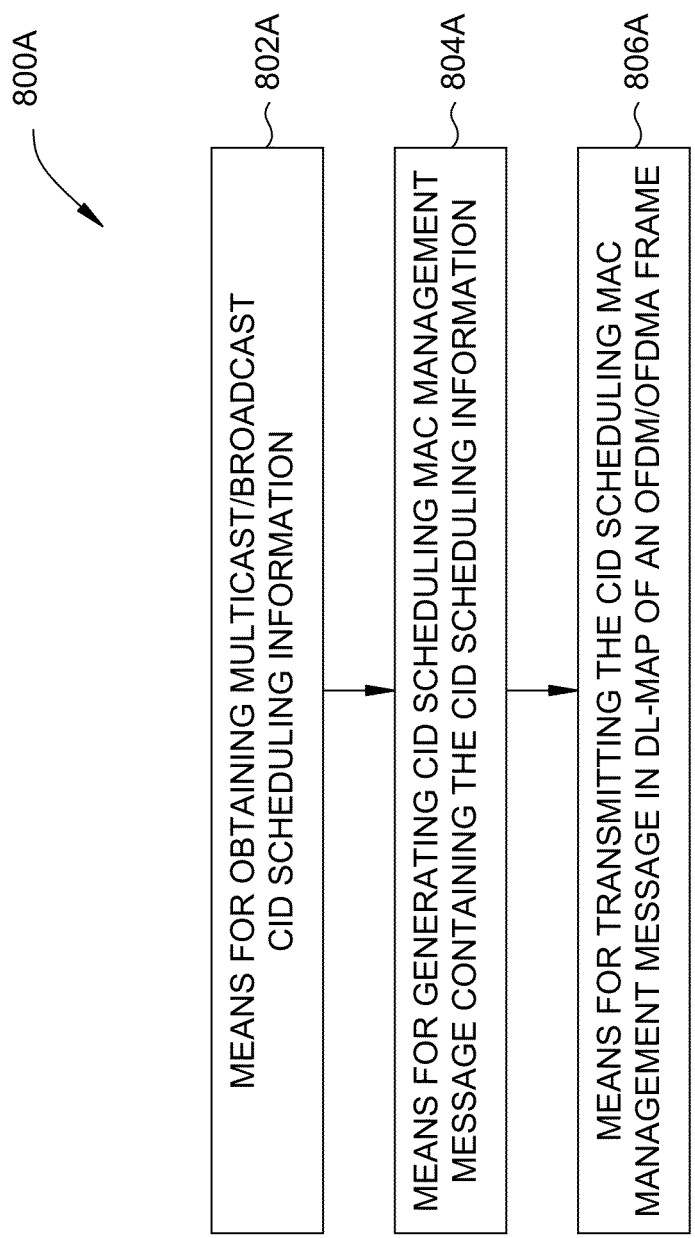
FIG. 8A is a block diagram of means corresponding to the example operations of FIG. 8, in accordance with certain embodiments of the present disclosure.
Figure 9A:
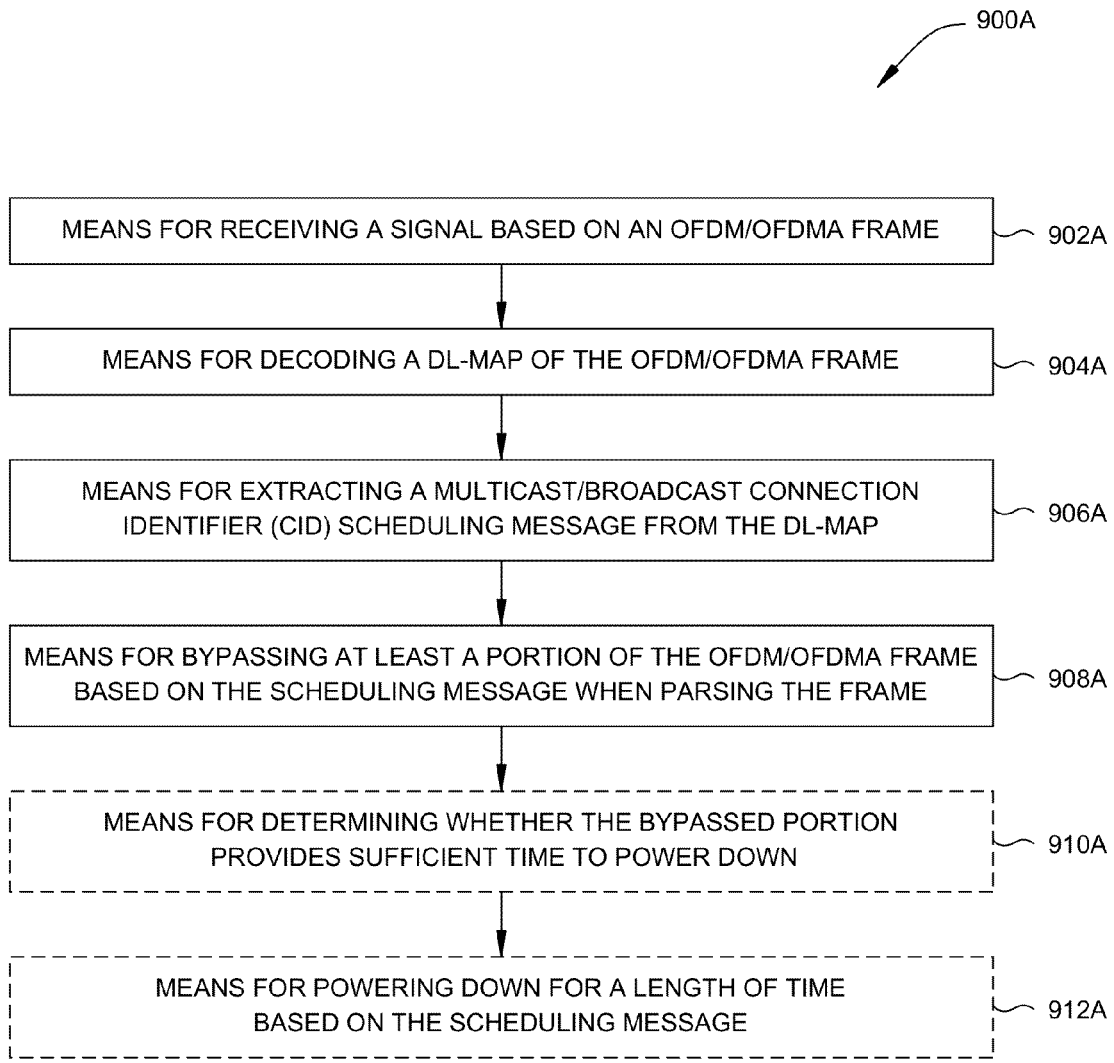
FIG. 9A is a block diagram of means corresponding to the example operations of FIG. 9, in accordance with certain embodiments of the present disclosure.

The operations described above may be performed by various hardware and/or software component(s) and/or module(s) corresponding to a number of means-plus-function blocks. For example, the operations 800 and 900 of FIGS. 8 and 9 described above may be performed by various hardware and/or software component(s) and/or module(s) corresponding to the means-plus-function blocks 800A-806A and 900A-912A illustrated in FIGS. 8A and 9A, respectively.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions or as one or more sets of instructions on a computer-readable medium or storage medium. A storage media may be any available media that can be accessed by a computer or by one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for processing multicast or broadcast data transmitted in orthogonal frequency-division multiplexing (OFDM) or orthogonal frequency division multiple access (OFDMA) frames, comprising:
   decoding a downlink MAP (DL-MAP);
   extracting connection identifier (CID) scheduling information contained in the DL-MAP, wherein the scheduling information identifies the location of data bursts associated with one or more multicast or broadcast CIDs within one or more OFDM or OFDMA frames; and
   bypassing at least a portion of the one or more frames based on the scheduling information when parsing the frames.

2. The method of claim 1, wherein the scheduling information is included in a Media Access Control (MAC) layer message.

3. The method of claim 2, wherein the MAC layer message comprises timing information, the one or more CIDs, and modulation information.

4. The method of claim 1, further comprising powering down circuitry during a period of time for the bypassing.

5. The method of claim 4, further comprising determining whether the bypassing time period is greater than a threshold before powering down the circuitry.

6. A receiver for processing multicast or broadcast data transmitted in orthogonal frequency-division multiplexing (OFDM) or orthogonal frequency division multiple access (OFDMA) frames, comprising:
   decoding logic configured to decode a downlink MAP (DL-MAP);
   extracting logic configured to extract connection identifier (CID) scheduling information contained in the DL-MAP, wherein the scheduling information identifies the location of data bursts associated with one or more multicast or broadcast CIDs within one or more OFDM or OFDMA frames; and
   bypassing logic configured to bypass at least a portion of the one or more frames based on the scheduling information when parsing the frames.

7. The receiver of claim 6, wherein the scheduling information is included in a Media Access Control (MAC) layer message.

8. The receiver of claim 7, wherein the MAC layer message comprises timing information, the one or more CIDs, and modulation information.

9. The receiver of claim 6, further comprising power logic configured to power down circuitry during a period of time for the bypassing.

10. The receiver of claim 9, further comprising comparison logic configured to determine whether the bypassing time period is greater than a threshold before powering down the circuitry.

11. An apparatus for processing multicast or broadcast data transmitted in orthogonal frequency-division multiplexing (OFDM) or orthogonal frequency division multiple access (OFDMA) frames, comprising:
- means for decoding a downlink MAP (DL-MAP);
- means for extracting connection identifier (CID) scheduling information contained in the DL-MAP, wherein the scheduling information identifies the location of data bursts associated with one or more multicast or broadcast CIDs within one or more OFDM or OFDMA frames; and
- means for bypassing at least a portion of the one or more frames based on the scheduling information when parsing the frames.

12. The apparatus of claim 11, wherein the scheduling information is included in a Media Access Control (MAC) layer message.

13. The apparatus of claim 12, wherein the MAC layer message comprises timing information, the one or more CIDs, and modulation information.

14. The apparatus of claim 11, further comprising means for powering down circuitry during a period of time for the bypassing.

15. The apparatus of claim 14, further comprising means for determining whether the bypassing time period is greater than a threshold before powering down the circuitry.

16. A mobile device capable of processing multicast or broadcast data, comprising:
- a receiver front end for receiving signals based on multicast or broadcast data transmitted in orthogonal frequency-division multiplexing (OFDM) or orthogonal frequency division multiple access (OFDMA) frames;
- decoding logic configured to decode a downlink MAP (DL-MAP);
- extracting logic configured to extract connection identifier (CID) scheduling information contained in the DL-MAP, wherein the scheduling information identifies the location of data bursts associated with one or more multicast or broadcast CIDs within one or more OFDM or OFDMA frames; and
- bypassing logic configured to bypass at least a portion of the one or more frames based on the scheduling information when parsing the frames.

17. The mobile device of claim 16, wherein the scheduling information is included in a Media Access Control (MAC) layer message.

18. The mobile device of claim 17, wherein the MAC layer message comprises timing information, the one or more CIDs, and modulation information.

19. The mobile device of claim 16, further comprising power logic configured to power down circuitry during a period of time for the bypassing.

20. The mobile device of claim 19, further comprising comparison logic configured to determine whether the bypassing time period is greater than a threshold before powering down the circuitry.

21. A computer-program product for processing multicast or broadcast data transmitted in orthogonal frequency-division multiplexing (OFDM) or orthogonal frequency division multiple access (OFDMA) frames comprising a non-transitory computer readable medium having a set of instructions stored thereon, the set of instructions being executable by one or more processing devices and the set of instructions comprising:
- instructions for decoding a downlink MAP (DL-MAP);
- instructions for extracting connection identifier (CID) scheduling information contained in the DL-MAP, wherein the scheduling information identifies the location of data bursts associated with one or more multicast or broadcast CIDs within one or more OFDM or OFDMA frames; and
- instructions for bypassing at least a portion of the one or more frames based on the scheduling information when parsing the frames.

22. The computer-program product of claim 21, wherein the scheduling information is included in a Media Access Control (MAC) layer message.

23. The computer-program product of claim 22, wherein the MAC layer message comprises timing information, the one or more CIDs, and modulation information.

24. The computer-program product of claim 21, wherein the set of instructions comprise instructions for powering down circuitry during a period of time for the bypassing.

25. The computer-program product of claim 24, wherein the set of instructions comprise instructions for determining whether the bypassing time period is greater than a threshold before powering down the circuitry.

* * * * *